US009909655B2

(12) United States Patent
Hou

(10) Patent No.: US 9,909,655 B2
(45) Date of Patent: Mar. 6, 2018

(54) MECHANICALLY OPERATIONAL STRUCTURE FOR CONTINUOUSLY VARIABLE TRANSMISSION

(71) Applicant: Yafeng Hou, Taiyuan (CN)

(72) Inventor: Yafeng Hou, Taiyuan (CN)

( * ) Notice: Subject to any disclaimer, the term of this patent is extended or adjusted under 35 U.S.C. 154(b) by 387 days.

(21) Appl. No.: 14/782,365

(22) PCT Filed: Jan. 10, 2014

(86) PCT No.: PCT/CN2014/000031
§ 371 (c)(1),
(2) Date: Oct. 5, 2015

(87) PCT Pub. No.: WO2014/166295
PCT Pub. Date: Oct. 16, 2014

(65) Prior Publication Data
US 2016/0069437 A1 Mar. 10, 2016

(30) Foreign Application Priority Data
Apr. 7, 2013 (CN) .......................... 2013 1 0117401

(51) Int. Cl.
*F16H 15/00* (2006.01)
*F16H 15/44* (2006.01)
*F16H 15/38* (2006.01)

(52) U.S. Cl.
CPC ............. *F16H 15/44* (2013.01); *F16H 15/38* (2013.01)

(58) Field of Classification Search
CPC .................................. F16H 15/44; F16H 15/38
See application file for complete search history.

(56) References Cited

U.S. PATENT DOCUMENTS 2,084,703 A * 6/1937 Pinaud .................... F16H 15/38
476/12
2,097,632 A * 11/1937 Madle ..................... F16H 15/38
476/44
(Continued)

FOREIGN PATENT DOCUMENTS

CN          201916451 U    8/2011
CN          202165541 U    3/2012
(Continued)

OTHER PUBLICATIONS

International Search Report (PCT/CN2014/000031) dated Apr. 3, 2014.

*Primary Examiner* — David M Fenstermacher
(74) *Attorney, Agent, or Firm* — Daniel J. Chalker; Edwin S. Flores; Chalker Flores, LLP

(57) ABSTRACT

Disclosed is a mechanically operational arrangement for continuously variable transmission, comprising a central shaft (1), wherein a toothed groove section (8) is circumferentially arranged in a middle portion of an external surface of the central shaft (1); wherein a shaft sleeve (9) is fitted over the external surface of the central shaft (1); wherein a plurality of axial limiting grooves (10) are provided on an external surface of the shaft sleeve (9); wherein inserted into each axial limiting groove (10) is a connecting plate (6); wherein an arc-shaped toothed wheel section (7) is arranged on an inner end face of each connecting plate (6); wherein each of the arc-shaped toothed wheel sections (7) is meshed with the toothed groove section (8); wherein a pivot (11) is mounted in a side face of each connecting plate (6); and wherein each connecting plate (6) is respectively hinged to a groove wall of one axial limiting groove (10) via the respective pivot (11). The mechanically operational arrangement for continuously variable transmission solves the problems existing in the prior art of continuously variable (Continued)

transmission arrangement that has an easily damaged steel belt with structural complexity and inconvenient maintenance.

9 Claims, 17 Drawing Sheets

(56) References Cited

U.S. PATENT DOCUMENTS

| | | | | |
|---|---|---|---|---|
| 2,325,502 | A * | 7/1943 | Georges | F16H 15/38 |
| | | | | 476/41 |
| 2,660,897 | A * | 12/1953 | Neidhart | F16H 15/28 |
| | | | | 476/48 |
| 3,209,606 | A * | 10/1965 | Yamamoto | F16H 15/28 |
| | | | | 476/38 |
| 2008/0254933 | A1* | 10/2008 | Dutson | F16H 15/38 |
| | | | | 476/42 |
| 2009/0203493 | A1* | 8/2009 | Dutson | F16H 15/38 |
| | | | | 476/44 |
| 2010/0043580 | A1* | 2/2010 | Bernier | F16H 1/006 |
| | | | | 74/412 R |

FOREIGN PATENT DOCUMENTS

| | | |
|---|---|---|
| CN | 102678857 A | 9/2012 |
| CN | 103234015 A | 8/2013 |
| GB | 726382 A | 3/1955 |
| JP | H1061739 A | 3/1998 |

* cited by examiner

MECHANICALLY OPERATIONAL STRUCTURE FOR CONTINUOUSLY VARIABLE TRANSMISSION

CROSS-REFERENCE TO RELATED APPLICATION

This application is a U.S. National Phase Application of International Application No. PCT/CN2014/000031, filed Jan. 10, 2014 claiming the priority of CN 201310117401.0 filed on 7 Apr. 2013, the content of each of which is incorporated by reference herein.

TECHNICAL FIELD

The present invention relates to continuously variable speed technology, in particular to a mechanically operational arrangement for continuously variable transmission.

BACKGROUND

Continuous variability refers to transmitting power through variable transmission arrangement by means of cooperation of driving wheel and driven wheel with variable operation diameters so as to achieve continuously variable transmission ratio, such that optimized match of the power train and the engine working condition is achievable. The prior art continuously variable transmission arrangement conventionally includes steel-belt continuously variable transmission arrangement, roller-turn plate continuously variable transmission arrangement or the like. The steel-belt continuously variable transmission arrangement has the problem that the steel belt is prone to failure, while the roller-turn plate continuously variable transmission arrangement has the problems of structural complexity and low reliability. Accordingly, there is a need for a novel continuously variable transmission arrangement that is able to solve the aforesaid problems existing in the prior art continuously variable transmission arrangements.

SUMMARY

The present invention provides a mechanically operational arrangement for continuously variable transmission, to solve the prior continuously variable transmission arrangements' problems of easily damaged steel belt, arrangement complexity and low reliability.

The present invention is achieved in the following technical solution: a mechanically operational arrangement for continuously variable transmission, comprises a central shaft, wherein a toothed groove section is circumferentially arranged in a middle portion of an external surface of the central shaft; wherein a shaft sleeve is fitted over the external surface of the central shaft; wherein a plurality of axial limiting grooves are provided on an external surface of the shaft sleeve; wherein a plurality of axial mounting plates are fixedly connected to the external surface of the shaft sleeve; wherein the axial mounting plates are of the same amount as the axial limiting grooves, and each of the axial mounting plates and each of the axial limiting grooves are alternately arranged along the circumferential direction in an equal space; wherein inserted into each axial limiting groove is a connecting plate; wherein an arc-shaped toothed wheel section is arranged on an inner end face of each connecting plate; wherein each of the arc-shaped toothed wheel sections is meshed with the toothed groove section; wherein mounted between every two adjacent axial mounting plates is a pivot; and wherein each connecting plate is respectively hinged to two adjacent axial mounting plates via the respective pivot.

The operation process is as follows: one of the dish-shaped concave wheels acts as the driving dish-shaped concave wheel, while the other of the dish-shaped concave wheels acts as the driven dish-shaped concave wheel. Rotation of the driving dish-shaped concave wheel is transmitted to the driven dish-shaped concave wheel by the friction generated between the driving dish-shaped concave wheel and a cylindrical wheel or a dish-shaped wheel. During the change of speed ratio, the central shaft or shaft sleeve is moved along an axial direction of the shaft sleeve, such that a relative movement between the central shaft and shaft sleeve is made. By means of the combined action of the relative movement and the inter-meshing between the arc-shaped toothed wheel section and the toothed groove section, the connecting plate acts a seesaw-like movement in the axial direction of the shaft sleeve (as shown in FIGS. 2, 3, 13 and 14), such that the change of speed ratio is achieved. On such basis, multiple changes of speed ratio can be achieved by connecting two said mechanically operational arrangements for continuously variable transmission in series or in parallel. In view of the process above, the mechanically operational arrangement for continuously variable transmission in the present disclosure is based on a brand new transmission arrangement and principle, and solves the problem of easily damaged steel belt, with simpler arrangement and convenient maintenance, compared with the prior art continuously variable transmission arrangements.

The present invention, based on the brand new transmission arrangement and principle, effectively solves the problems of easily damaged steel belt, structural complexity and low reliability, and is suitable for variable transmission of the vehicles.

REFERENCE SIGNS IN THE DRAWINGS

Figure 1:
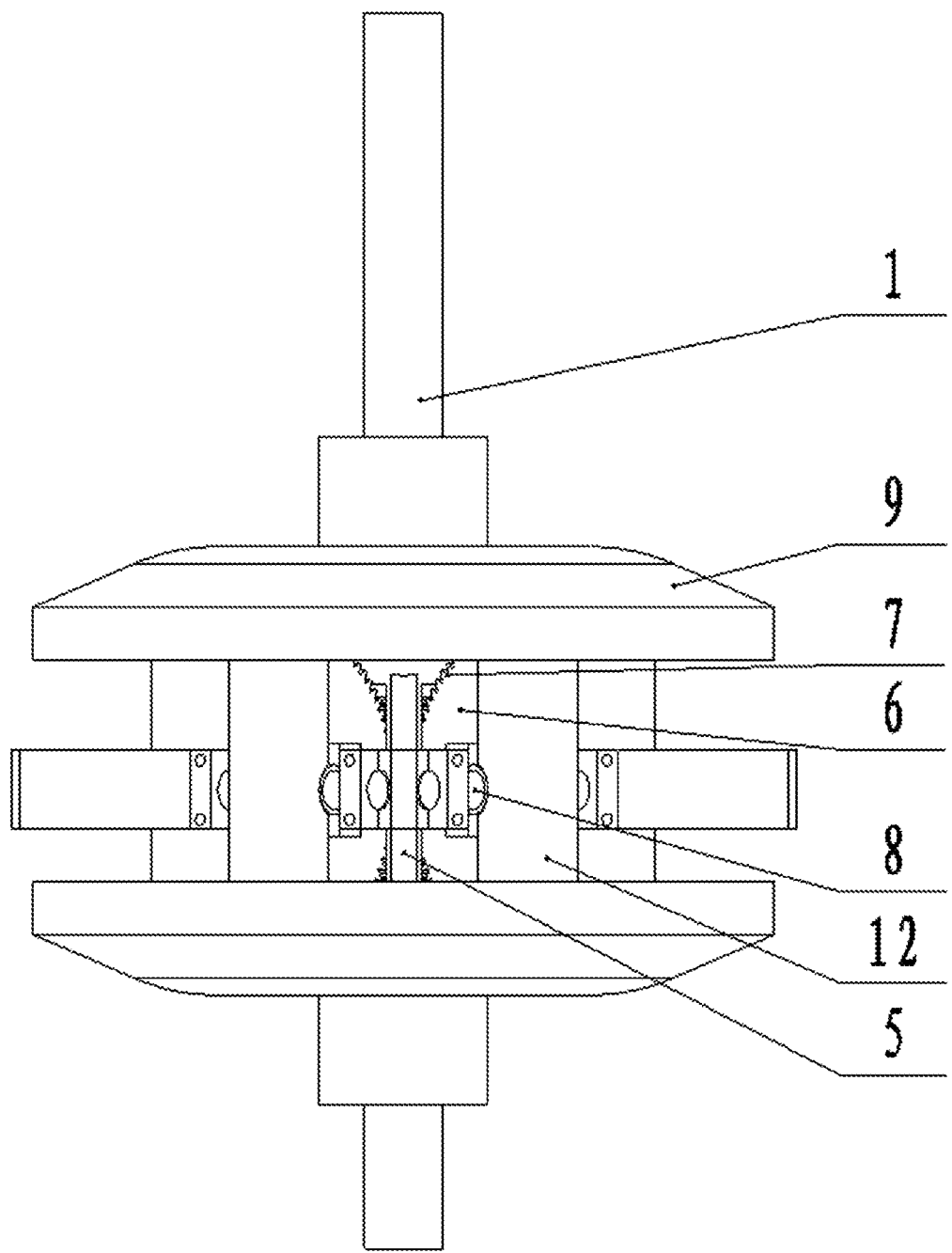
FIG. 1 illustrates a first schematically structural view of the present invention.

1—central shaft; 2—toothed groove section; 3—shaft sleeve; 4—axial limiting groove; 5—axial mounting plate; 6—connecting plate; 7—arc-shaped toothed wheel section; 8—pivot; 9—dish-shaped concave wheel; 10—cylindrical wheel; 11—wheel cap; 12—wheel sleeve; 13—dish-shaped wheel; 14—wheel carrier.

DETAILED DESCRIPTION OF EMBODIMENTS

Embodiment 1

A mechanically operational arrangement for continuously variable transmission comprises a central shaft 1. A toothed groove section 2 is circumferentially arranged in a middle portion of an external surface of the central shaft 1. A shaft sleeve 3 is fitted over the external surface of the central shaft 1. A plurality of axial limiting grooves 4 are provided on an external surface of the shaft sleeve 3. A plurality of axial mounting plates 5 are fixedly connected to the external surface of the shaft sleeve 3. The axial mounting plates 5 are of the same amount as the axial limiting grooves 4, and each of the axial mounting plates 5 and each of the axial limiting grooves 4 are alternately arranged along the circumferential direction in an equal space. Inserted into each axial limiting groove 4 is a connecting plate 6. An arc-shaped toothed wheel section 7 is arranged on an inner end face of each connecting plate 6. Each of the arc-shaped toothed wheel sections 7 is meshed with the toothed groove section 2. Mounted between every two adjacent axial mounting plates 5 is a pivot 8. Each connecting plate 6 is respectively hinged to two adjacent axial mounting plates 5 via the respective pivot 8.

In this embodiment, the toothed groove section 2 is an equal-difference annular toothed groove section, or the toothed groove section may be of helical toothed with the toothed groove oriented in an angle compared with the central shaft.

A dish-shaped concave wheel 9 is mounted on either end of the central shaft 1, with dish openings of the two dish-shaped concave wheels facing towards each other.

Figure 2:
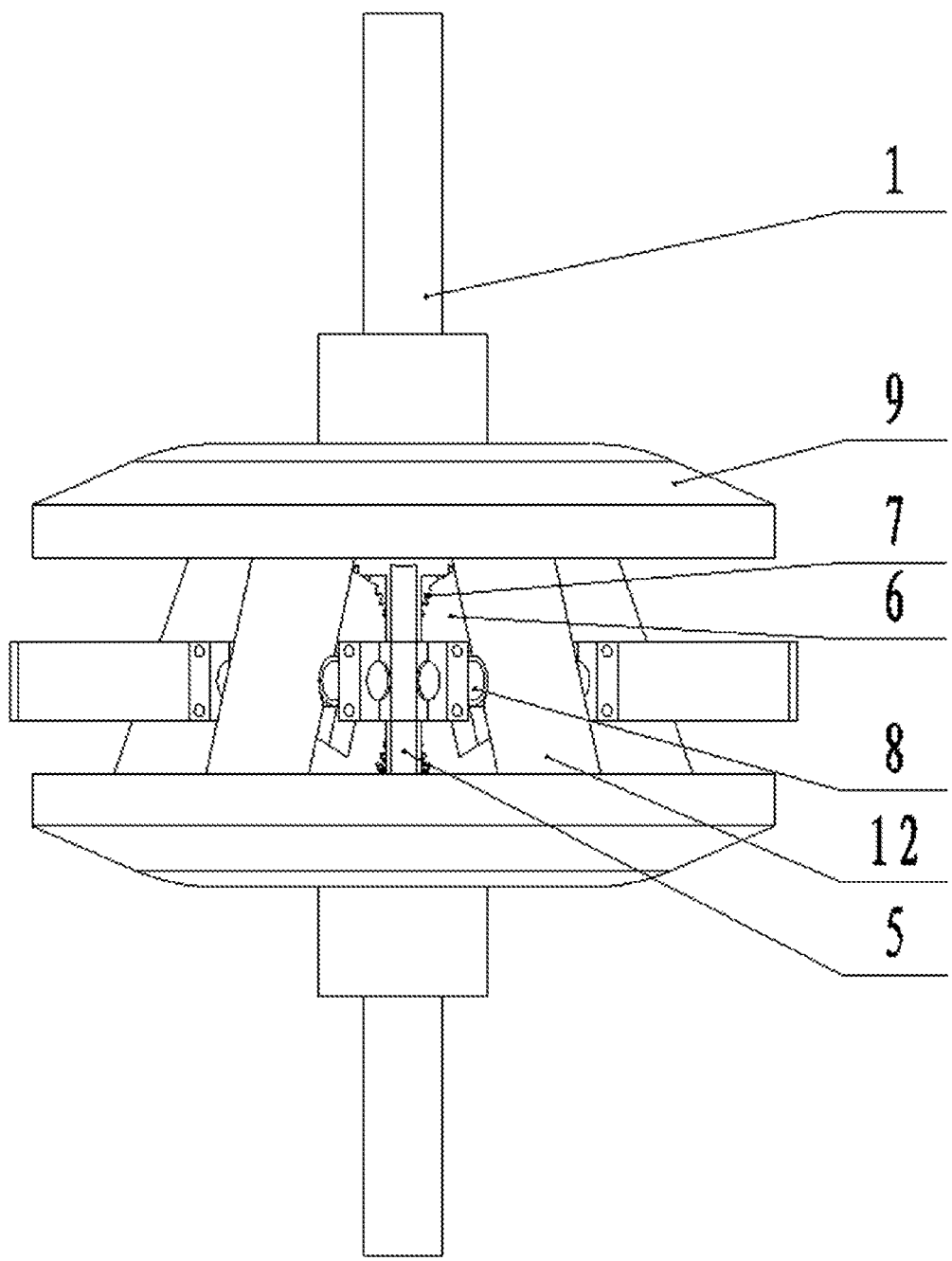
FIG. 2 is a reference view of FIG. 1 in an operational state.
Figure 3:
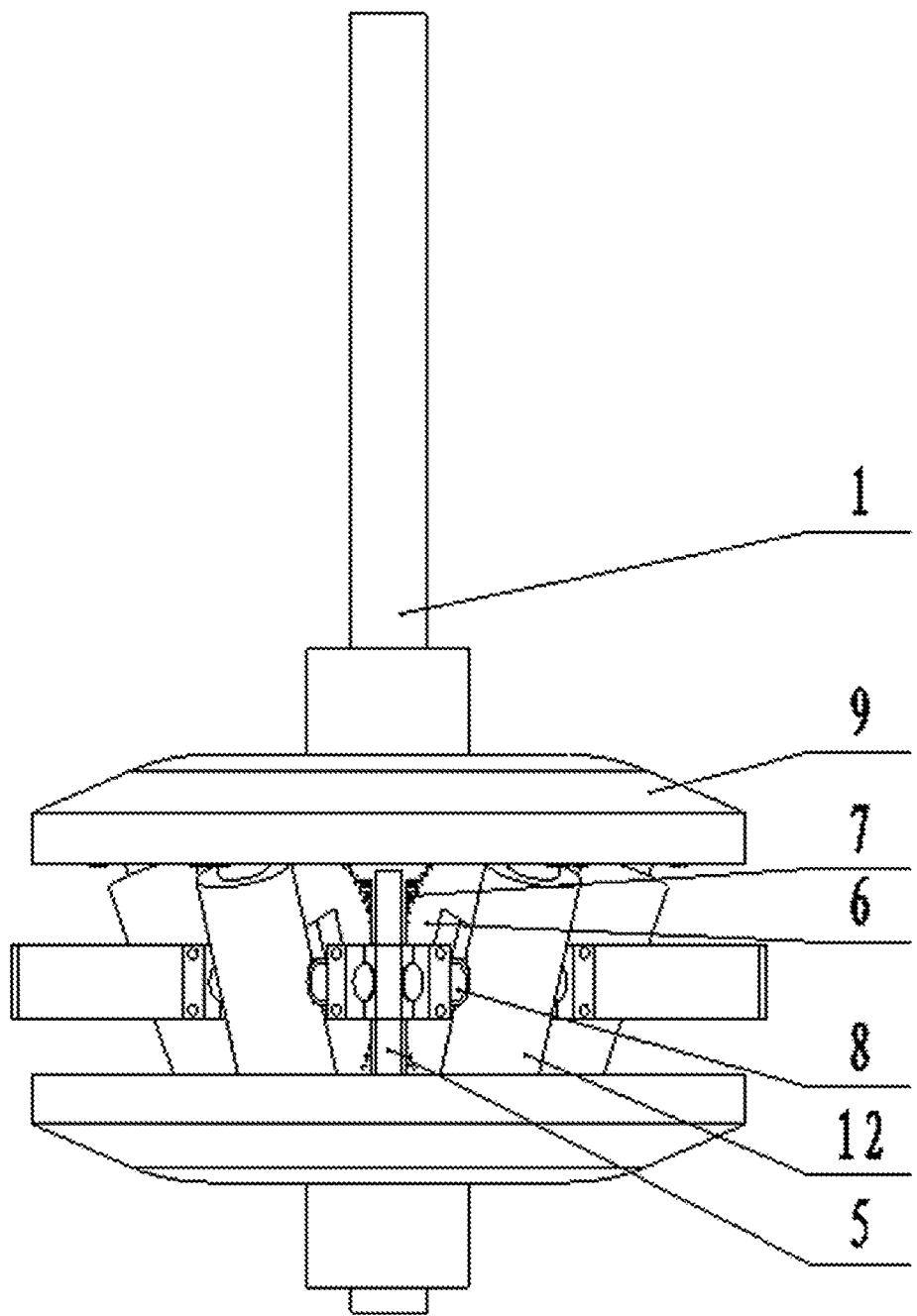
FIG. 3 is a reference view of FIG. 1 in another operational state.
Figure 4:
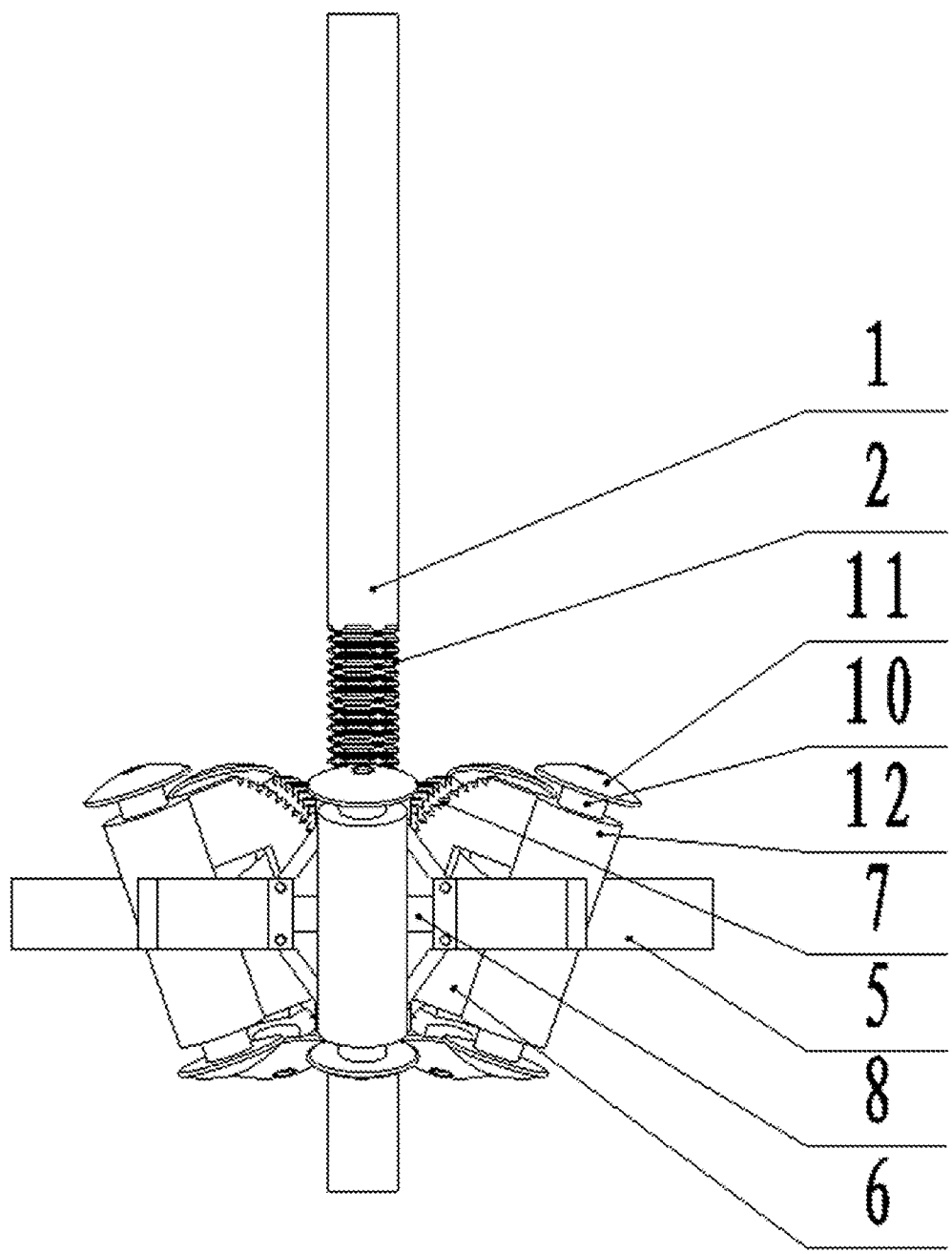
FIG. 4 illustrates a schematically structural view of a part of FIG. 3.
Figure 5:
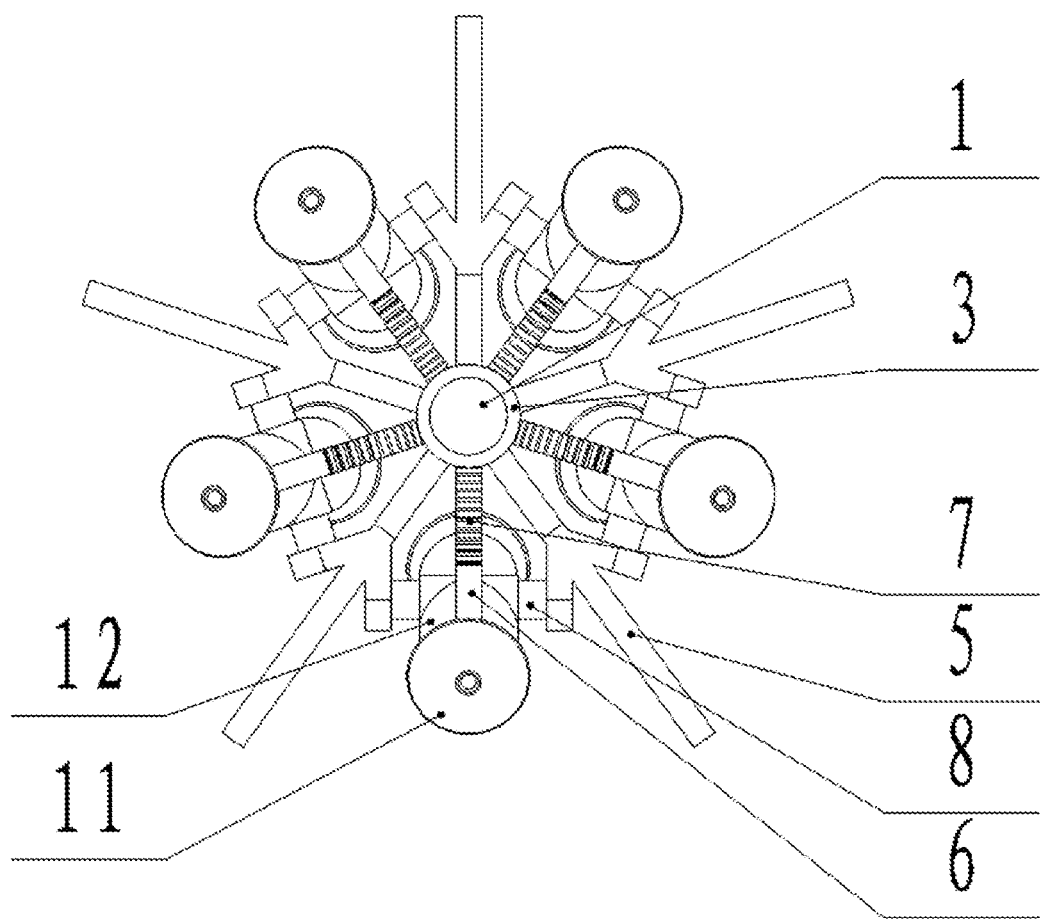
FIG. 5 is a top view of FIG. 4.
Figure 6:
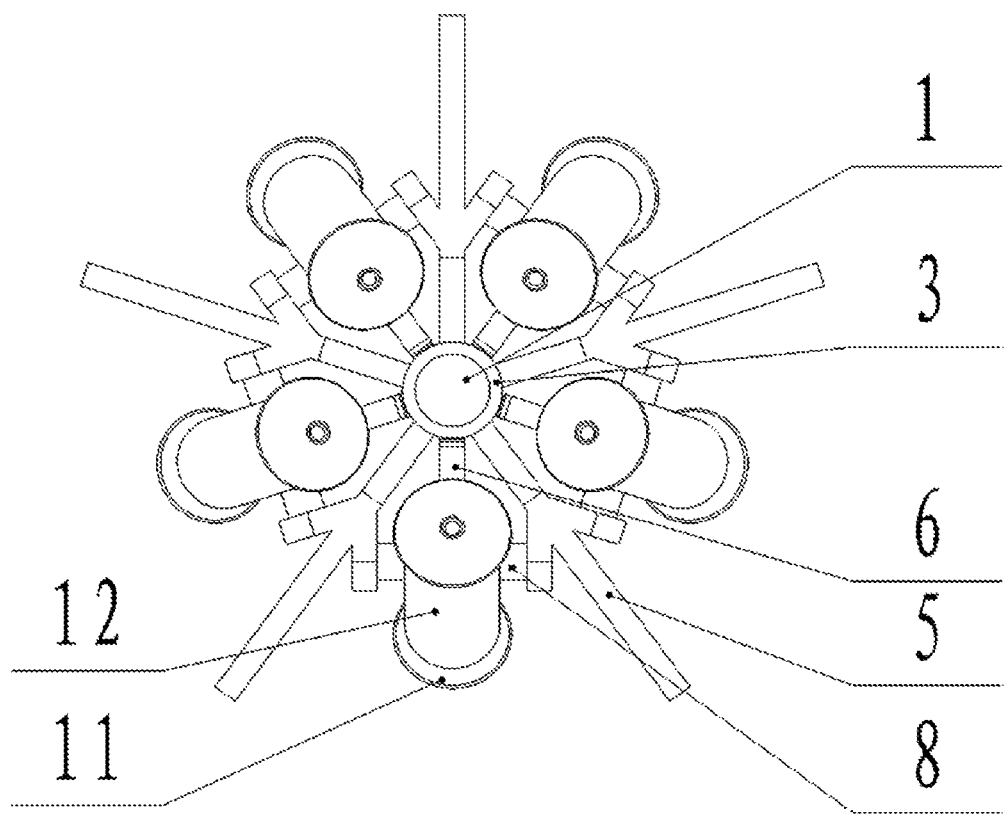
FIG. 6 is a bottom view of FIG. 4.
Figure 7:
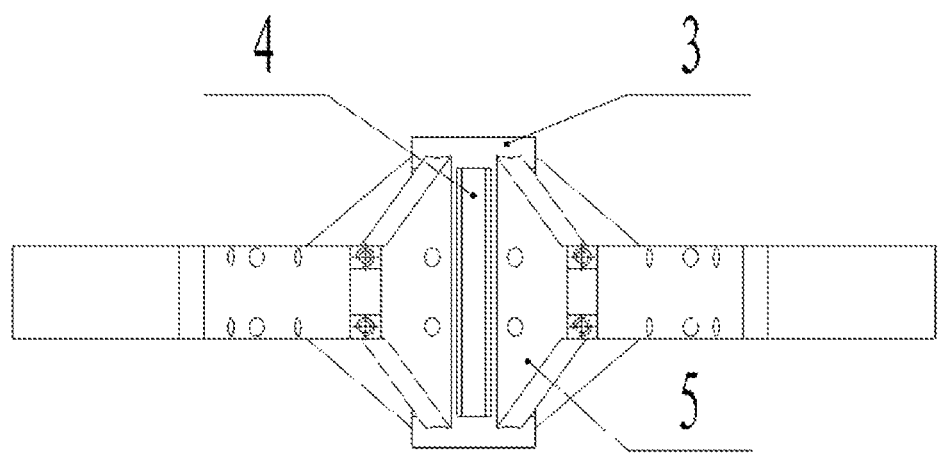
FIG. 7 illustrates a schematically structural view of a further part of FIG. 4.
Figure 8:
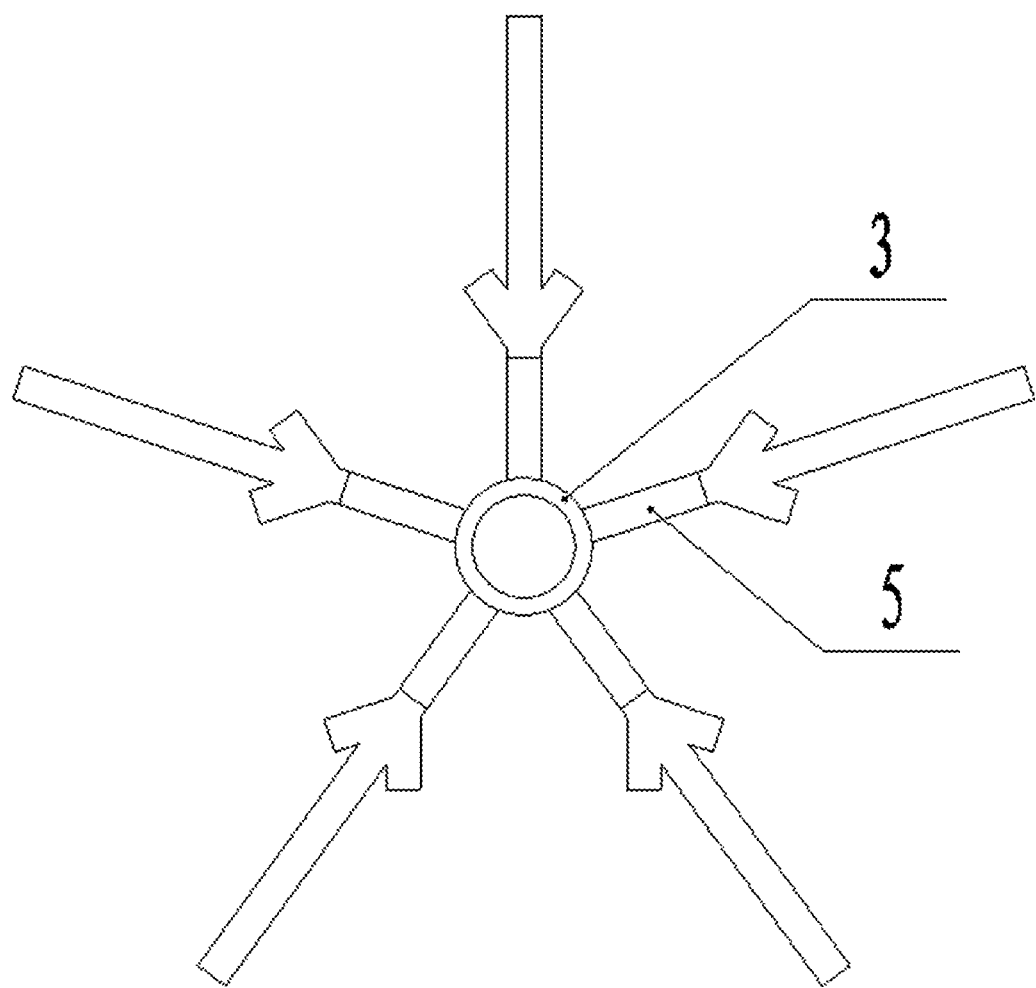
FIG. 8 is a top view of FIG. 7.
Figure 9:
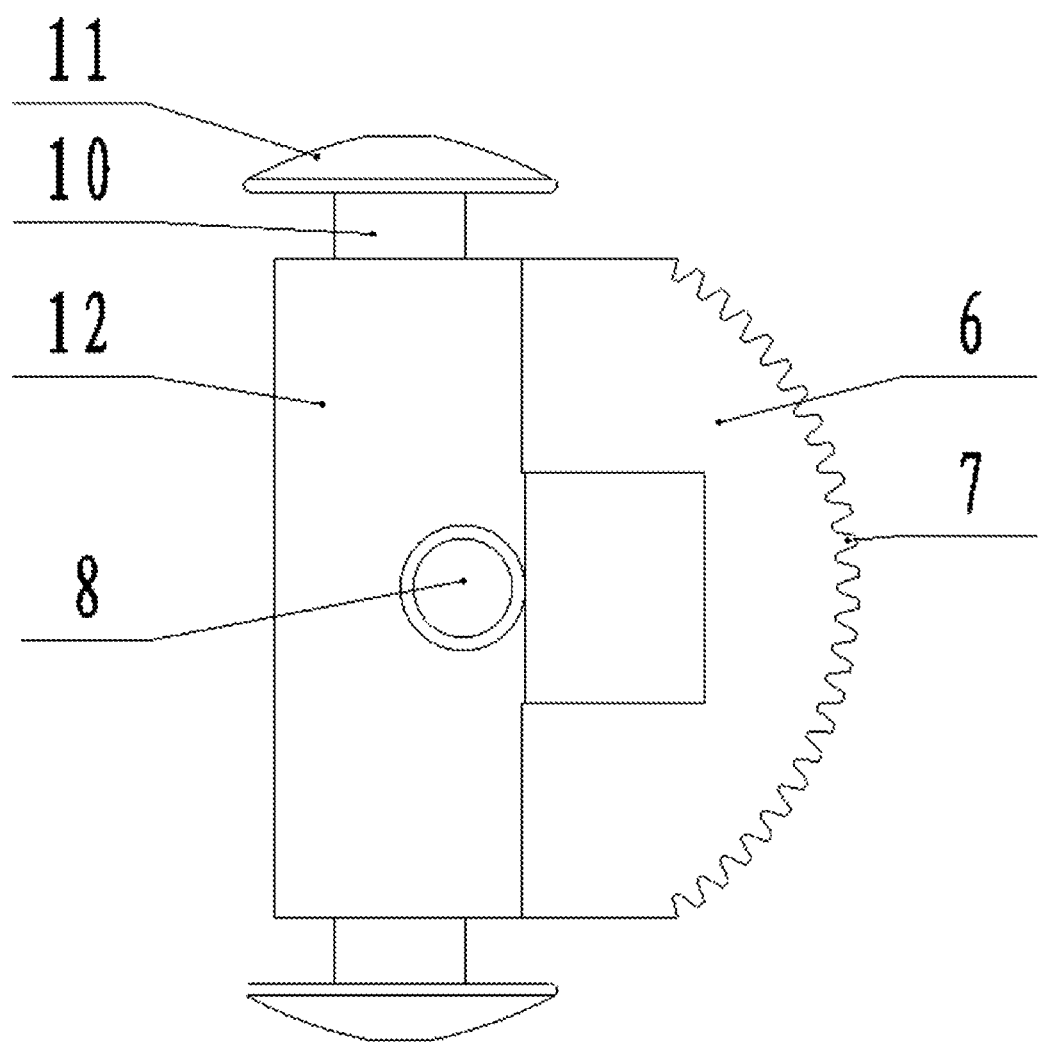
FIG. 9 illustrates a schematically structural view of a further part of FIG. 4.
Figure 10:
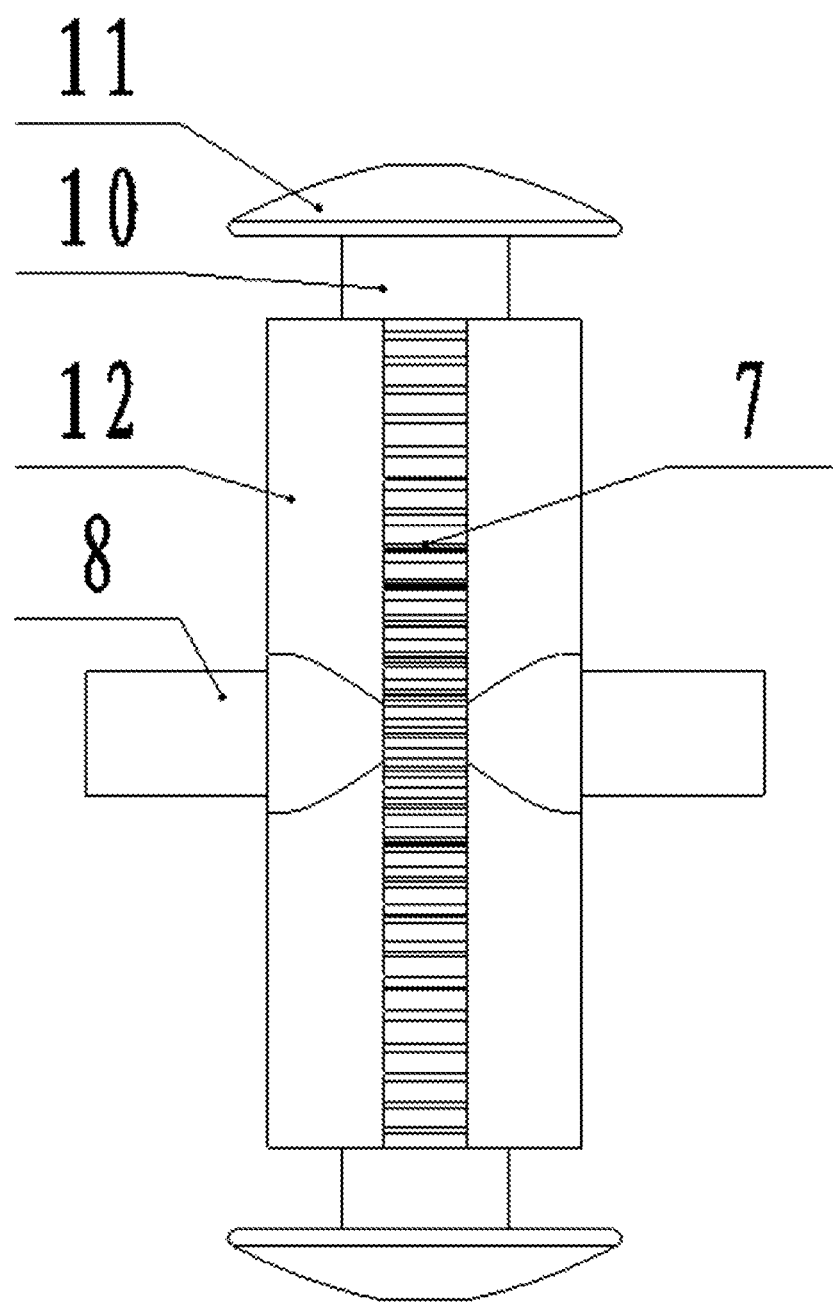
FIG. 10 is a right view of FIG. 9.
Figure 11:
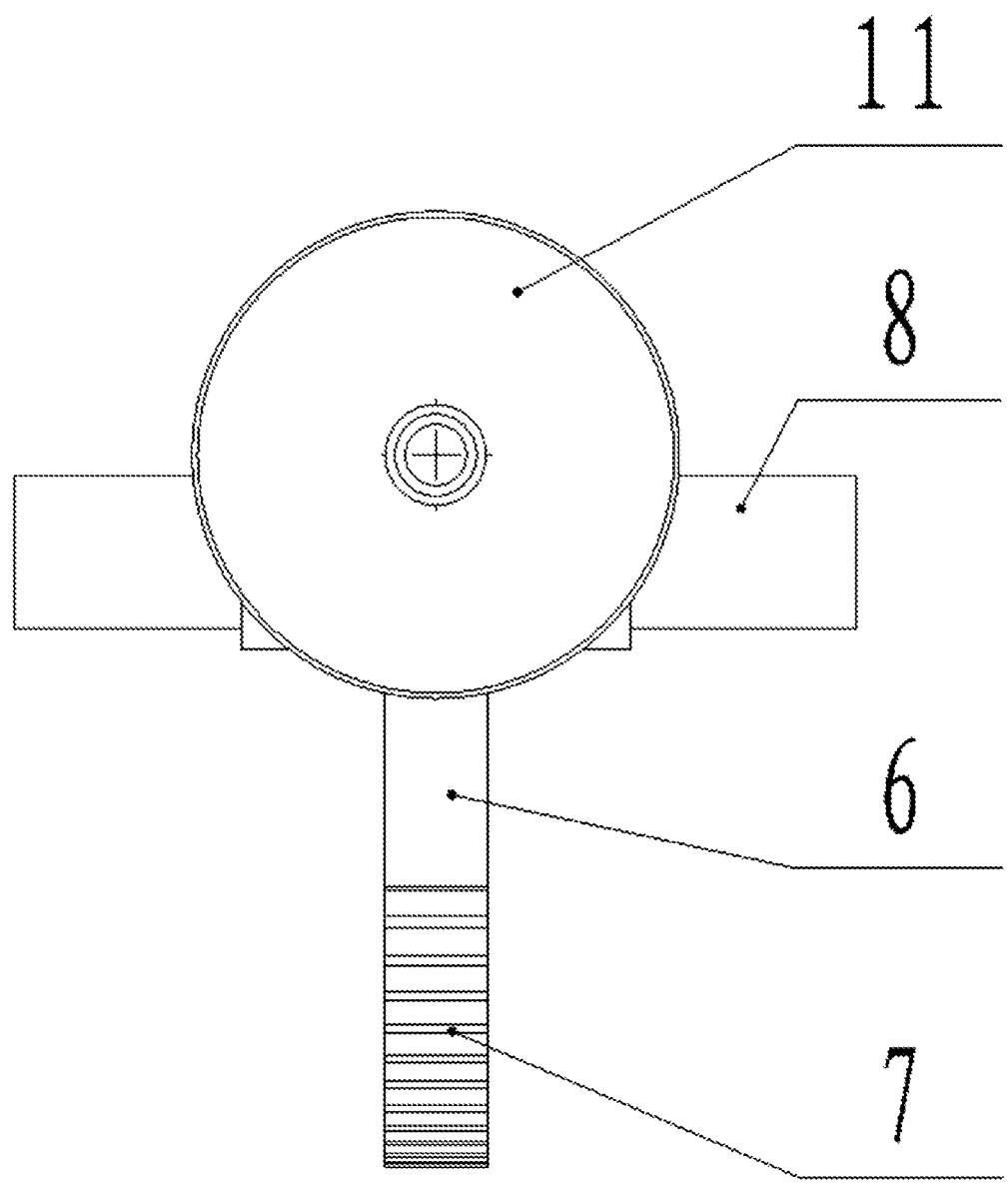
FIG. 11 is a top view of FIG. 10.

As shown in FIGS. 1-11, provided between the dish openings of the two dish-shaped concave wheels 9 are a plurality of cylindrical wheels 10 that are circumferentially arranged in an equal space. The cylindrical wheels 10 are of the same amount as the connecting plates 6. A wheel cap 11 is provided at either end of each cylindrical wheel 10. The two wheel caps 4 of each cylindrical wheel 3 contact with inner faces of the two dish-shaped concave wheels 9 respectively. A wheel sleeve 12 is fitted over an external surface of each cylindrical wheel 10. The external surface of each wheel sleeve 12 is respectively fixed to an outer end face of one connecting plate 6. Each pivot 8 is respectively fixed to the external surface of one wheel sleeve 12.

The equal-difference annular toothed groove section has a cross section of equilateral polygon with tooth edges that are of the same amount as the connecting plates 6.

When embodied, the dish-shaped concave wheel and the shaft sleeve or the central shaft may form a bearing-to-shaft fitting. The cylindrical wheel and the wheel sleeve may also form a bearing-to-shaft fitting. During the change of speed ratio, the dish-shaped wheel is rotated about the central shaft or the shaft sleeve, whilst the central shaft and shaft sleeve are not rotated together. A plurality of booster devices are further comprised which are symmetrically mounted on the wheel sleeves 12 and provide power for the seesaw-like movement, and the symmetrical devices are of the same amount as the wheel sleeves 12. The booster devices may provide power for the seesaw-like movement, such that the service life of the mechanically operational arrangement for continuously variable transmission is prolonged. The shaft sleeve 3 and the two dish-shaped concave wheels 9 are independently controlled, namely the shaft sleeve 3 and two dish-shaped concave wheels 9 are not linked to move together.

Embodiment 2

A mechanically operational arrangement for continuously variable transmission comprises a central shaft 1. A toothed groove section 2 is circumferentially arranged in a middle portion of an external surface of the central shaft 1. A shaft sleeve 3 is fitted over the external surface of the central shaft 1. A plurality of axial limiting grooves 4 are provided on an external surface of the shaft sleeve 3. A plurality of axial mounting plates 5 are fixedly connected to the external surface of the shaft sleeve 3. The axial mounting plates 5 are of the same amount as the axial limiting grooves 4, and each of the axial mounting plates 5 and each of the axial limiting grooves 4 are alternately arranged along the circumferential direction in an equal space. Inserted into each axial limiting groove 4 is a connecting plate 6. An arc-shaped toothed wheel section 7 is arranged on an inner end face of each connecting plate 6. Each of the arc-shaped toothed wheel sections 7 is meshed with the toothed groove section 2. Mounted between every two adjacent axial mounting plates 5 is a pivot 8. Each connecting plate 6 is respectively hinged to two adjacent axial mounting plates 5 via the respective pivot 8.

In this embodiment, the toothed groove section 2 is a spiral toothed groove section.

A dish-shaped concave wheel 9 is mounted on either end of the central shaft 1, with dish openings of the two dish-shaped concave wheels facing towards each other.

As shown in FIGS. 1-11, provided between the dish openings of the two dish-shaped concave wheels 9 are a plurality of cylindrical wheels 10 that are circumferentially arranged in an equal space. The cylindrical wheels 10 are of the same amount as the connecting plates 6. A wheel cap 11 is provided at either end of each cylindrical wheel 10. The two wheel caps 4 of each cylindrical wheel 3 contact with an inner face of the two dish-shaped concave wheels 9 respectively. A wheel sleeve 12 is fitted over an external surface of each cylindrical wheel 10. The external surface of each wheel sleeve 12 is respectively fixed to an outer end face of one connecting plate 6. Each pivot 8 is respectively fixed to the external surface of one wheel sleeve 12.

When embodied, the dish-shaped concave wheel and the shaft sleeve or the central shaft may form a bearing-to-shaft fitting. The cylindrical wheel and the wheel sleeve may also form a bearing-to-shaft fitting. During the change of speed ratio, the dish-shaped wheel is rotated about the central shaft or the shaft sleeve, whilst the central shaft and shaft sleeve are not rotated together. A plurality of booster devices are further comprised which are symmetrically mounted on the wheel sleeves 12 and provide power for the seesaw-like movement, and the symmetrical devices are of the same amount as the wheel sleeves 12. The booster devices may provide power for the seesaw-like movement, such that the service life of the mechanically operational arrangement for continuously variable transmission is prolonged. The shaft sleeve 3 and the two dish-shaped concave wheels 9 are independently controlled, namely the shaft sleeve 3 and two dish-shaped concave wheels 9 are not linked to move together.

Embodiment 3

A mechanically operational arrangement for continuously variable transmission comprises a central shaft 1. A toothed groove section 2 is circumferentially arranged in a middle portion of an external surface of the central shaft 1. A shaft sleeve 3 is fitted over the external surface of the central shaft 1. A plurality of axial limiting grooves 4 are provided on an external surface of the shaft sleeve 3. A plurality of axial mounting plates 5 are fixedly connected to the external surface of the shaft sleeve 3. The axial mounting plates 5 are of the same amount as the axial limiting grooves 4, and each of the axial mounting plates 5 and each of the axial limiting grooves 4 are alternately arranged along the circumferential direction in an equal space. Inserted into each axial limiting groove 4 is a connecting plate 6. An arc-shaped toothed wheel section 7 is arranged on an inner end face of each connecting plate 6. Each of the arc-shaped toothed wheel sections 7 is meshed with the toothed groove section 2. Mounted between every two adjacent axial mounting plates 5 is a pivot 8. Each connecting plate 6 is respectively hinged to two adjacent axial mounting plates 5 via the respective pivot 8.

In this embodiment, the toothed groove section 2 is an equal-difference annular toothed groove section, or the toothed groove section may be of helical toothed with the toothed groove oriented in an angle compared with the central shaft.

A dish-shaped concave wheel 9 is mounted on either end of the central shaft 1, with dish openings of the two dish-shaped concave wheels facing towards each other.

Figure 12:
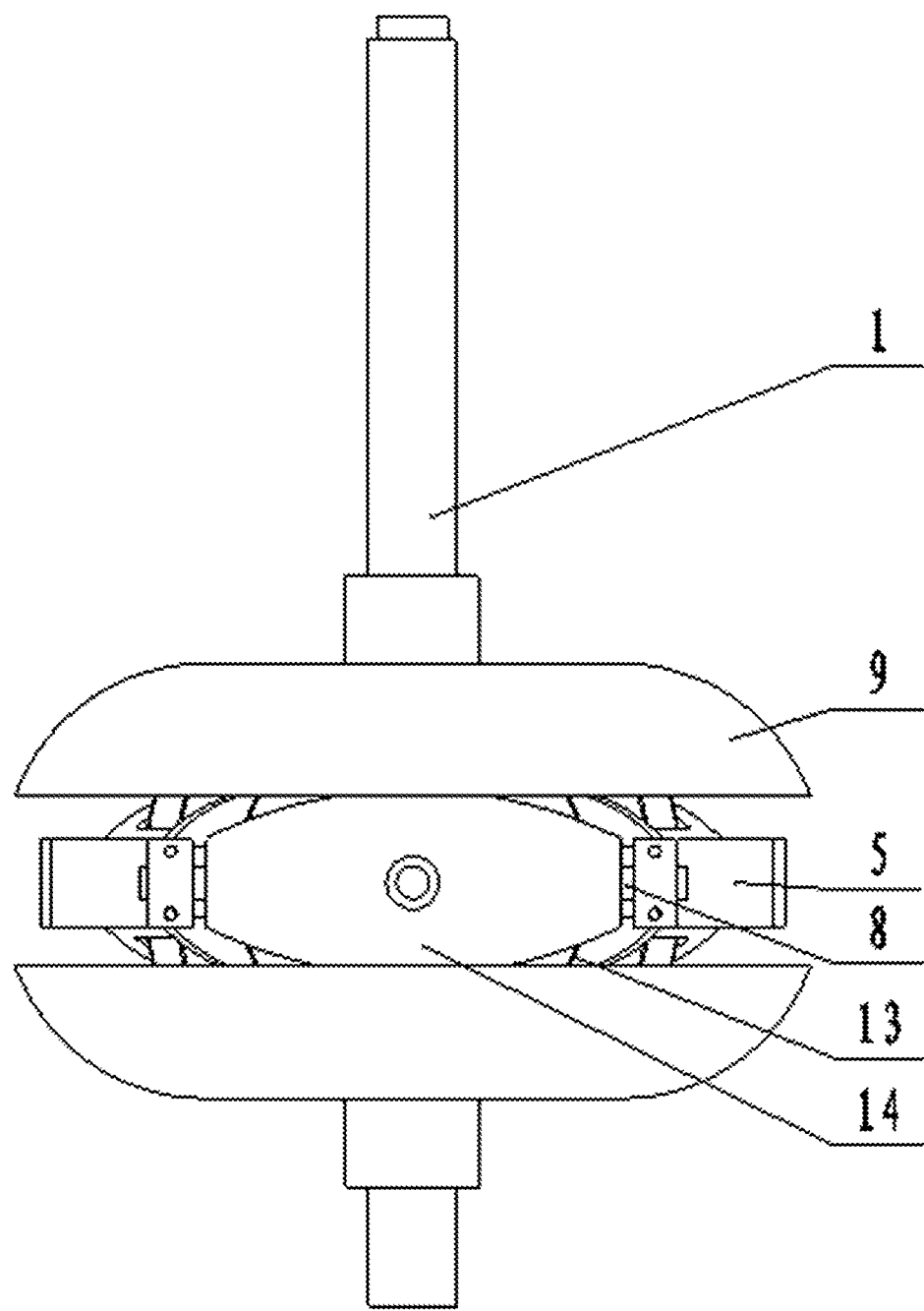
FIG. 12 illustrates a second schematically structural view of the present invention.
Figure 13:
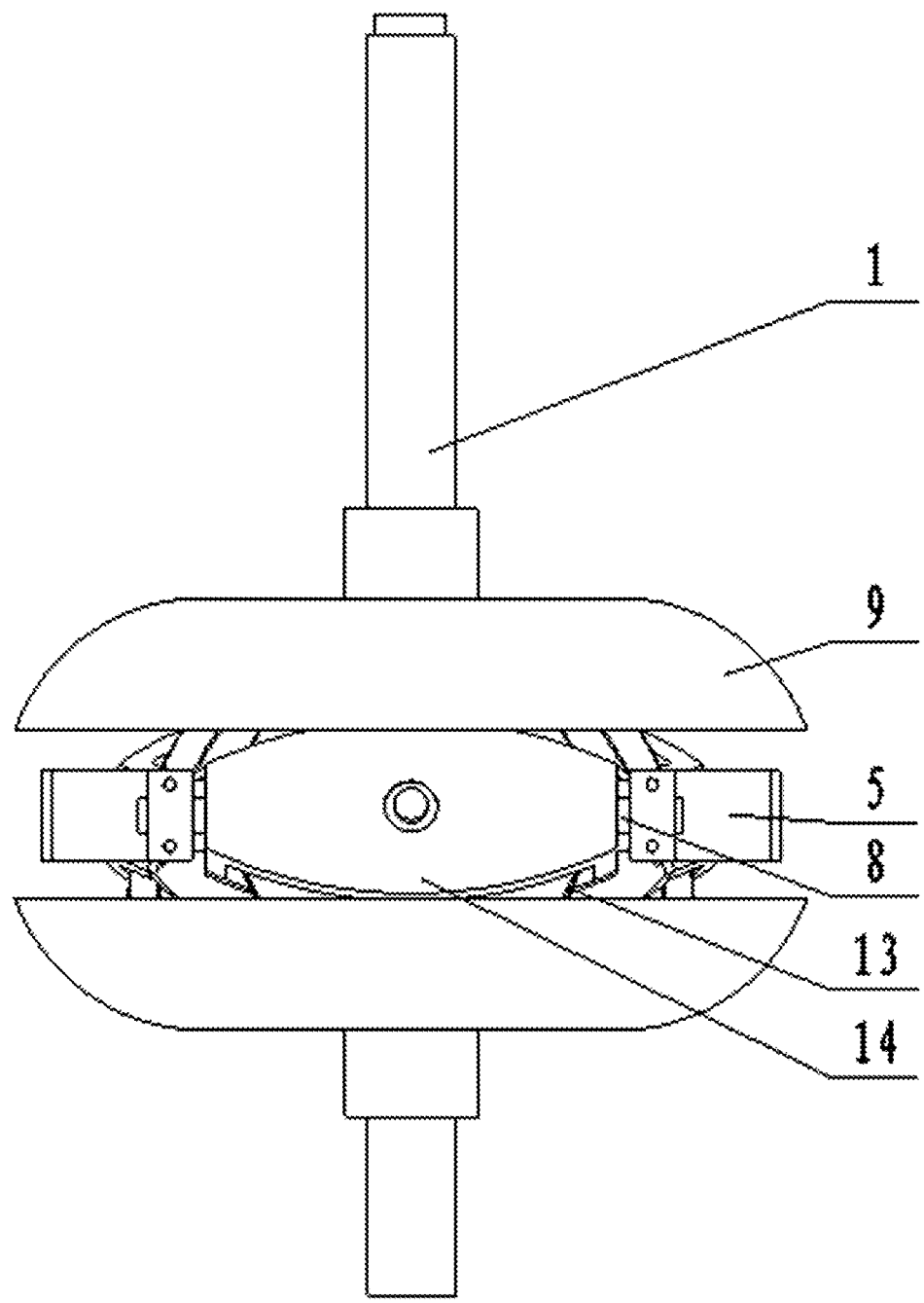
FIG. 13 is a reference view of FIG. 12 in an operational state.
Figure 14:
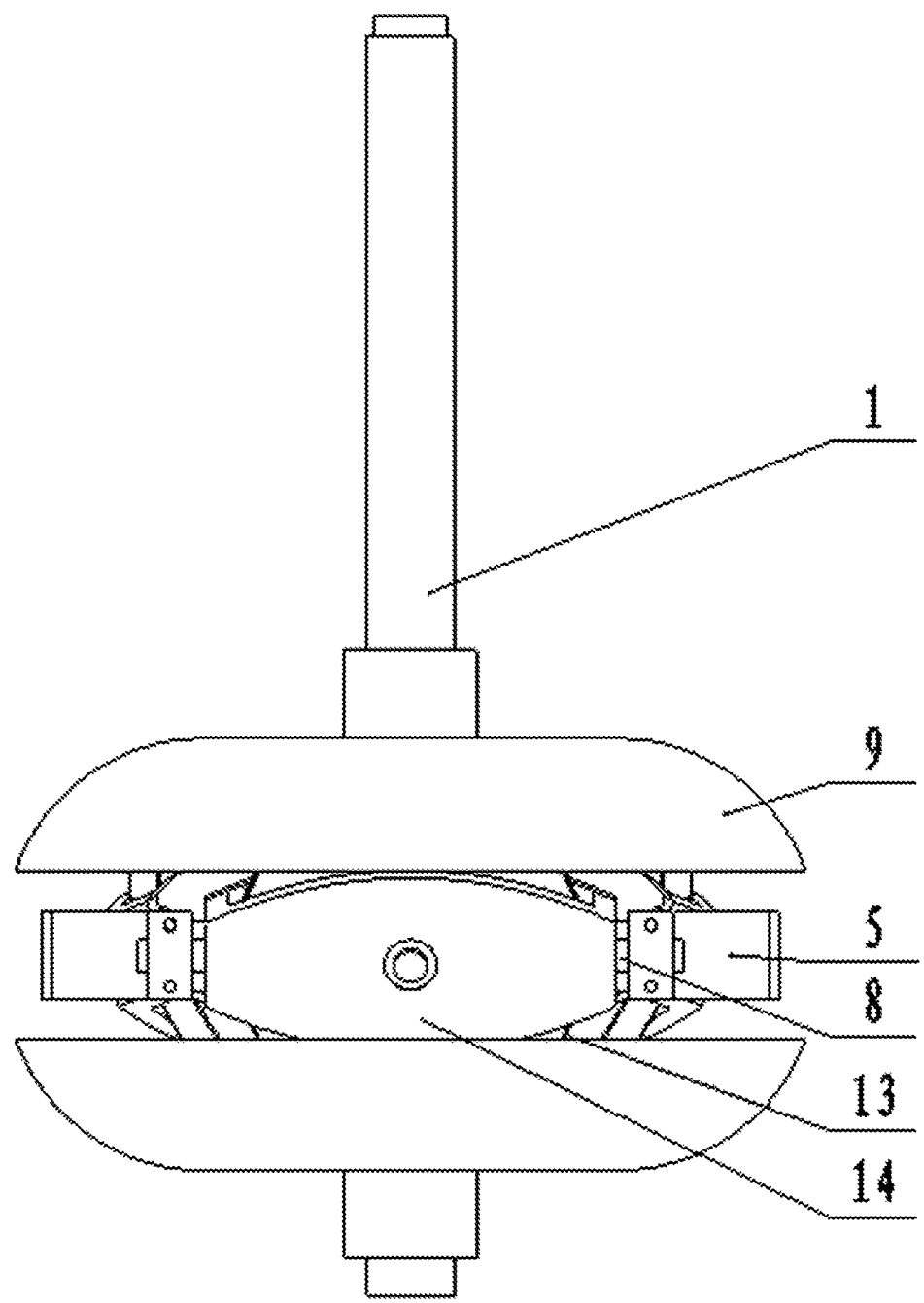
FIG. 14 is a reference view of FIG. 12 in another operational state.
Figure 15:
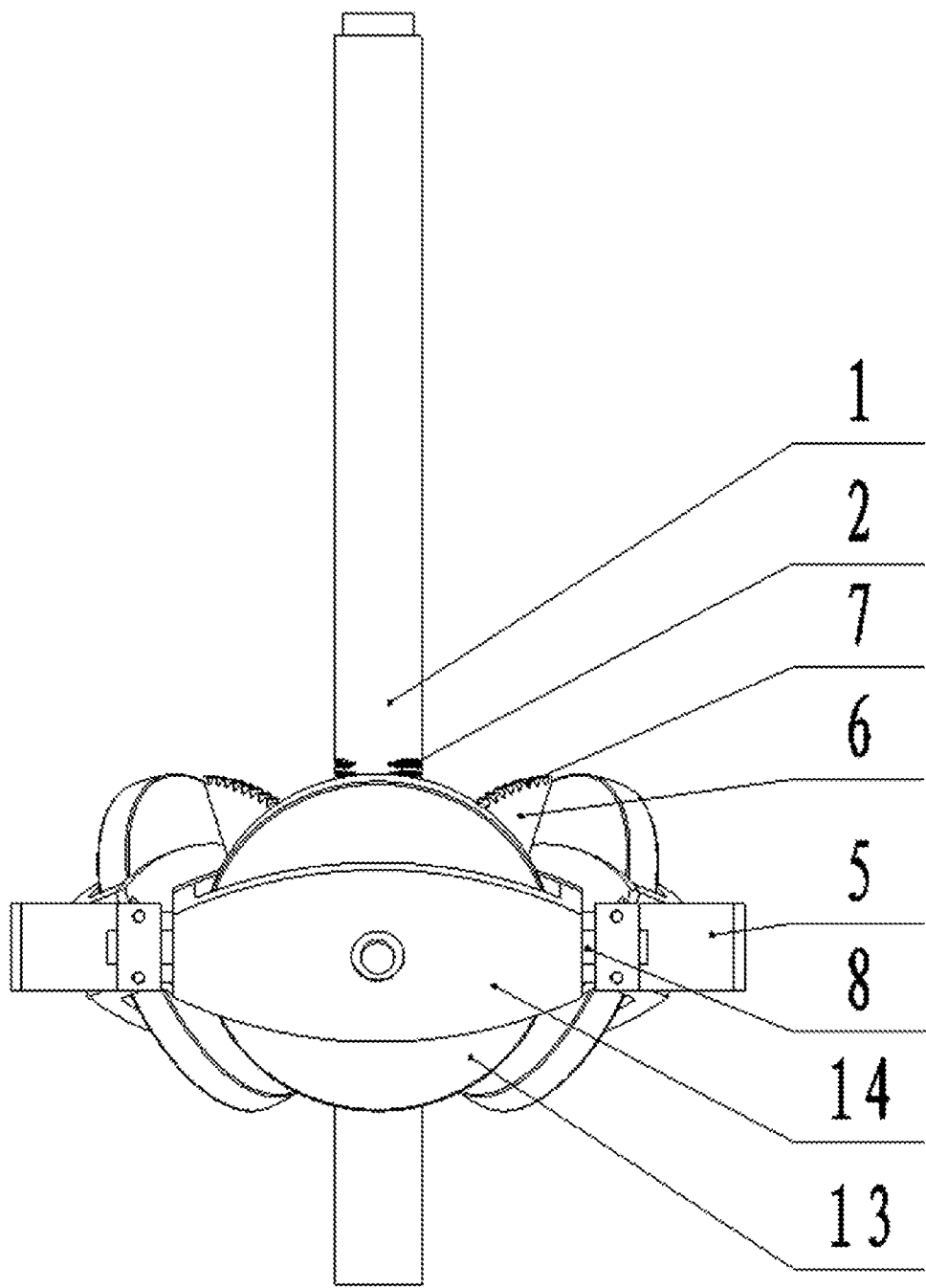
FIG. 15 illustrates a schematically structural view of a part of FIG. 14.
Figure 16:
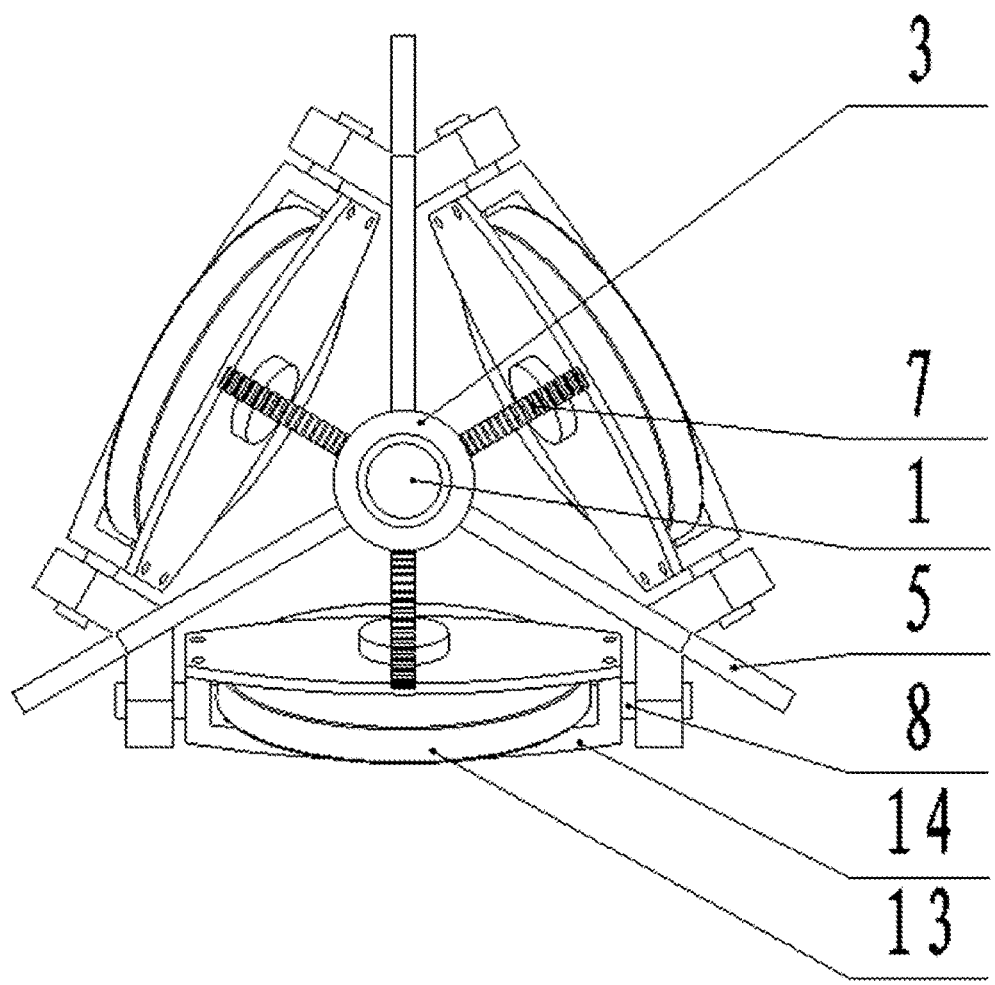
FIG. 16 is a top view of FIG. 15.
Figure 17:
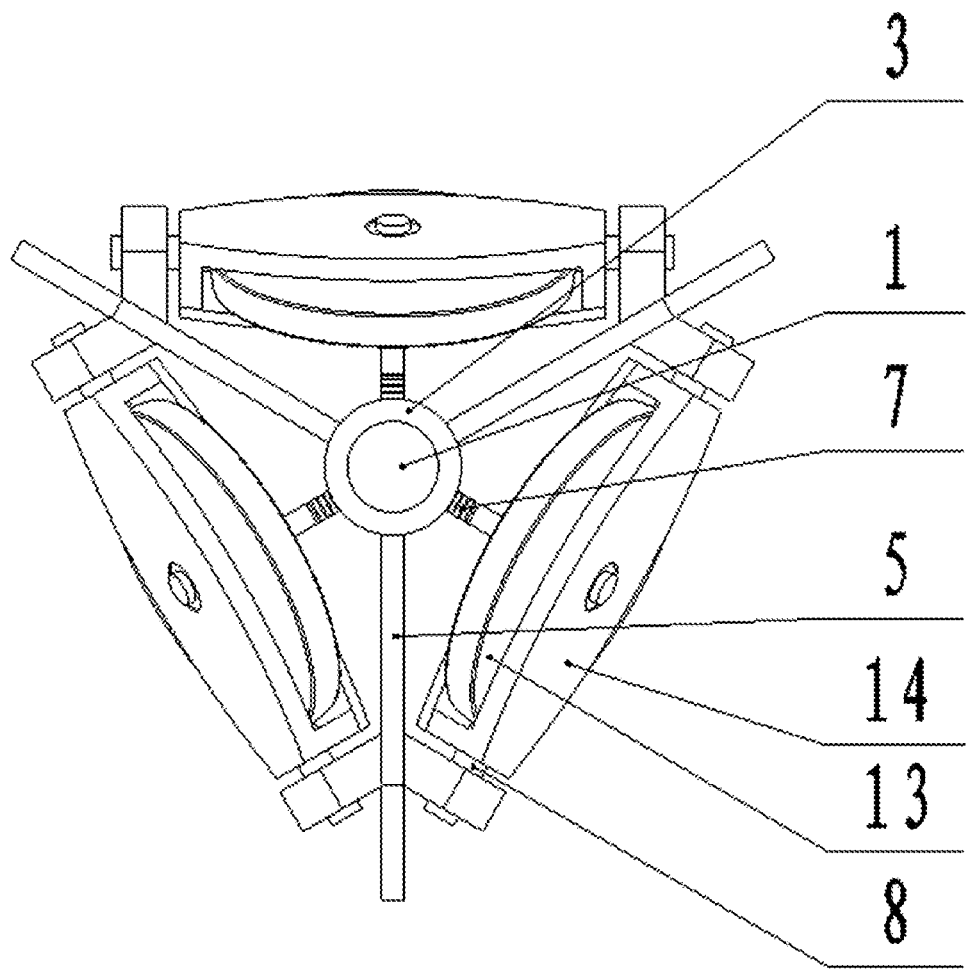
FIG. 17 is a bottom view of FIG. 15.
Figure 18:
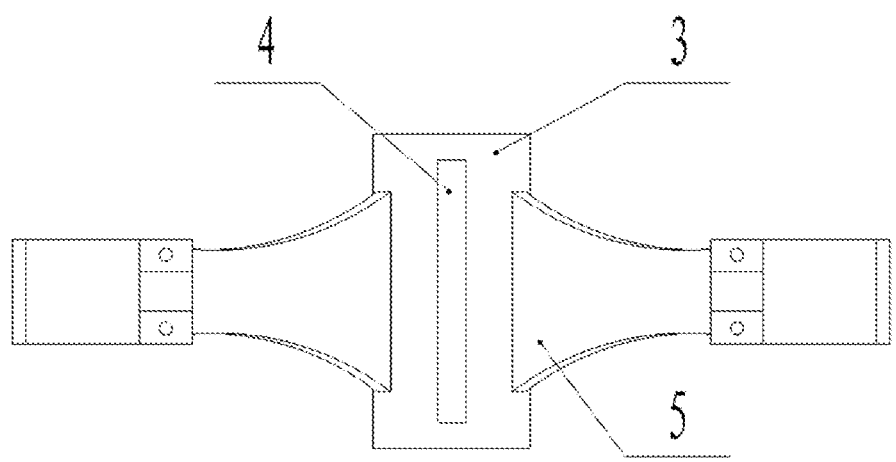
FIG. 18 illustrates a schematically structural view of a part of FIG. 15.
Figure 19:
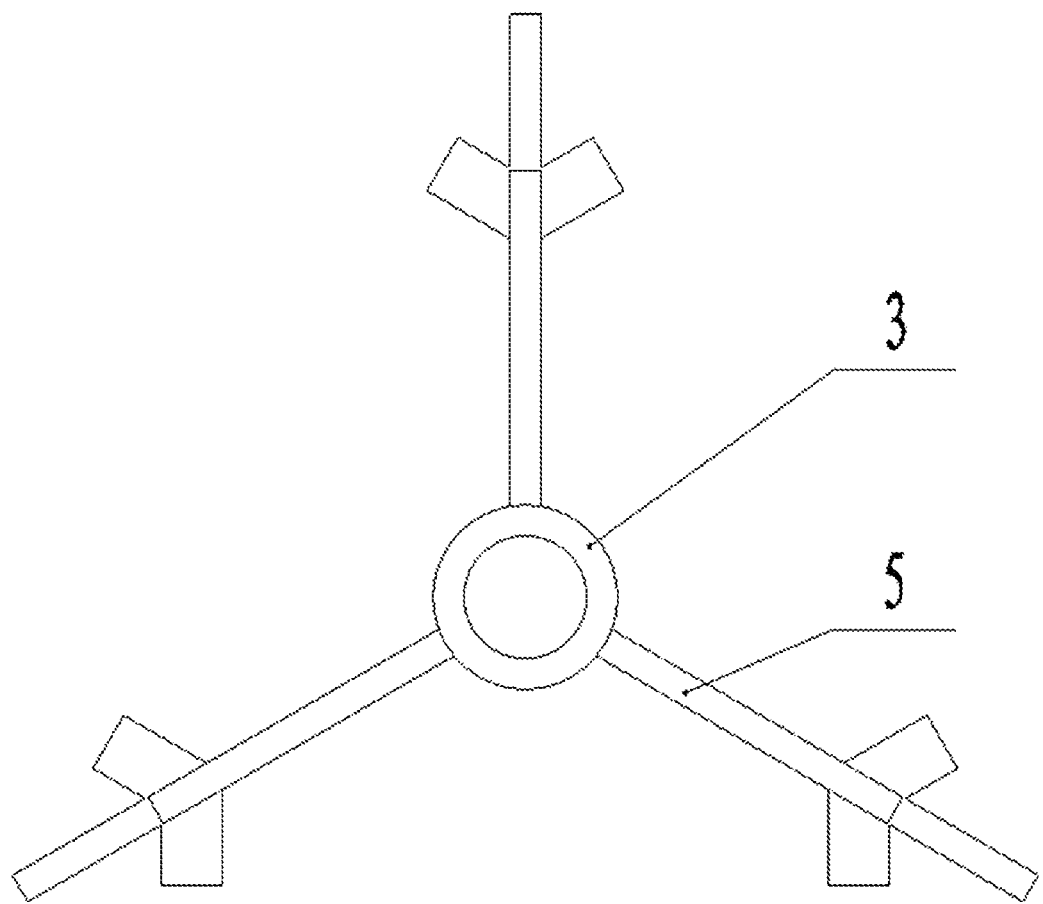
FIG. 19 is a top view of FIG. 18.

As shown in FIGS. 12-19, provided between the dish openings of the two dish-shaped concave wheels 9 are a plurality of dish-shaped wheels 13 that are circumferentially arranged in an equal space. The dish-shaped wheels 13 are of the same amount as the connecting plates 6. A rim of each of the dish-shaped wheels 13 contacts with the inner faces of the two dish-shaped concave wheels 9. A wheel carrier 14 is fitted over an external surface of each dish-shaped wheel 13. The external surface of each wheel carrier 14 is respectively fixed to an outer end face of one connecting plate 6. Each pivot 8 is respectively fixed to the external surface of one wheel carrier 14.

The equal-difference annular toothed groove section has a cross section of equilateral polygon with tooth edges that are of the same amount as the connecting plates 6.

When embodied, the dish-shaped concave wheel and the shaft sleeve or the central shaft may form a bearing-to-shaft fitting. The dish-shaped wheel and the wheel sleeve may also form a bearing-to-shaft fitting. During the change of speed ratio, the dish-shaped wheel is rotated about the central shaft or the shaft sleeve, whilst the central shaft and shaft sleeve are not rotated together. A plurality of booster devices are further comprised which are symmetrically mounted on the wheel carriers 14 and provide power for the seesaw-like movement, and the symmetrical devices are of the same amount as the wheel carriers 14. The booster devices may provide power for the seesaw-like movement, such that the service life of the mechanically operational arrangement for continuously variable transmission is prolonged. The shaft sleeve 3 and the two dish-shaped concave wheels 9 are independently controlled, namely the shaft sleeve 3 and two dish-shaped concave wheels 9 are not linked to move together.

Embodiment 4

A mechanically operational arrangement for continuously variable transmission comprises a central shaft 1. A toothed groove section 2 is circumferentially arranged in a middle portion of an external surface of the central shaft 1. A shaft sleeve 3 is fitted over the external surface of the central shaft 1. A plurality of axial limiting grooves 4 are provided on an external surface of the shaft sleeve 3. A plurality of axial mounting plates 5 are fixedly connected to the external surface of the shaft sleeve 3. The axial mounting plates 5 are of the same amount as the axial limiting grooves 4, and each of the axial mounting plates 5 and each of the axial limiting grooves 4 are alternately arranged along the circumferential direction in an equal space. Inserted into each axial limiting groove 4 is a connecting plate 6. An arc-shaped toothed wheel section 7 is arranged on an inner end face of each connecting plate 6. Each of the arc-shaped toothed wheel sections 7 is meshed with the toothed groove section 2. Mounted between every two adjacent axial mounting plates 5 is a pivot 8. Each connecting plate 6 is respectively hinged to two adjacent axial mounting plates 5 via the respective pivot 8.

In this embodiment, the toothed groove section 2 is a spiral toothed groove section.

A dish-shaped concave wheel 9 is mounted on either end of the central shaft 1, with dish openings of the two dish-shaped concave wheels facing towards each other.

As shown in FIGS. 12-19, provided between the dish openings of the two dish-shaped concave wheels 9 are a plurality of dish-shaped wheels 13 that are circumferentially arranged in an equal space. The dish-shaped wheels 13 are of the same amount as the connecting plates 6. A rim of each of the dish-shaped wheels 13 contacts with the inner faces of the two dish-shaped concave wheels 9. A wheel carrier 14 is fitted over an external surface of each dish-shaped wheel 13. The external surface of each wheel carrier 14 is respectively fixed to an outer end face of one connecting plate 6. Each pivot 8 is respectively fixed to the external surface of one wheel carrier 14.

When embodied, the dish-shaped concave wheel and the shaft sleeve or the central shaft may form a bearing-to-shaft fitting. The dish-shaped wheel and the wheel sleeve may also form a bearing-to-shaft fitting. During the change of speed ratio, the dish-shaped wheel is rotated about the central shaft or the shaft sleeve, whilst the central shaft and shaft sleeve are not rotated together. A plurality of booster devices are further comprised which are symmetrically mounted on the wheel carriers 14 and provide power for the seesaw-like movement, and the symmetrical devices are of the same amount as the wheel carriers 14. The booster devices may provide power for the seesaw-like movement, such that the service life of the mechanically operational arrangement for continuously variable transmission is prolonged. The shaft sleeve 3 and the two dish-shaped concave wheels 9 are independently controlled, namely the shaft sleeve 3 and two dish-shaped concave wheels 9 are not linked to move together.

In Embodiments 1-4, the central shaft, as an example, has a cross section of round shape, which may, nevertheless, be replaced with other shapes, such as regular triangle, square or the like, as desired. In Embodiments 1 and 2, the number of the axial mounting plates and the axial limiting grooves is five each. In Embodiments 3 and 4, the number of the axial mounting plates and the axial limiting grooves is three each.

In Embodiments 1 and 3, the toothed groove section 2 is an equal-difference annular toothed groove section, such that axial movement of the central shaft is achieved by the following means: a spiral toothed groove section is provided at an end of the central shaft, a nut is threaded onto the spiral toothed groove section, the nut is rotated by an external motor, and the nut is inhibited from making axial movement such that the central shaft is driven to make axial movement, such that the change of speed ratio is achieved. In Embodiments 2 and 4, the toothed groove section 2 is a spiral toothed groove section, such that the seesaw-like movement is achieved by rotating the central shaft, such that the change of speed ratio is achieved.

I claim:

1. A mechanically operational arrangement for continuously variable transmission, comprising:
   a central shaft (1), wherein a toothed groove section (2) is circumferentially arranged in a middle portion of an external surface of the central shaft (1);
   a shaft sleeve (3) fitted over the external surface of the central shaft (1);
   a plurality of axial limiting grooves (4) provided on an external surface of the shaft sleeve (3);
   a plurality of axial mounting plates (5) fixedly connected to the external surface of the shaft sleeve (3);
   wherein the axial mounting plates (5) are of the same amount as the axial limiting grooves (4), and each of the axial mounting plates (5) and each of the axial limiting grooves (4) are alternately arranged along the circumferential direction in an equal space;
   a connecting plate (6) inserted into each axial limiting groove (4);
   an arc-shaped toothed wheel section (7) arranged on an inner end face of each connecting plate (6);
   wherein each of the arc-shaped toothed wheel sections (7) is meshed with the toothed groove section (2);
   a pivot (8) mounted between every two adjacent axial mounting plates (5); and
   wherein each connecting plate (6) is respectively hinged to two adjacent axial mounting plates (5) via the respective pivot (8).

2. The mechanically operational arrangement for continuously variable transmission of claim 1, wherein the toothed groove section (2) is an equal-difference annular toothed groove section, or the toothed groove section (2) is of helical toothed with the toothed groove oriented in an angle compared with the central shaft (1).

3. The mechanically operational arrangement for continuously variable transmission of claim 1, wherein the equal-difference annular toothed groove section has a cross section of equilateral polygon with tooth edges that are of the same amount as the connecting plates (6).

4. The mechanically operational arrangement for continuously variable transmission of claim 2, further comprising a dish-shaped concave wheel (9) mounted on either end of the central shaft (1), with dish openings of the two dish-shaped concave wheels facing towards each other.

5. The mechanically operational arrangement for continuously variable transmission of claim 1, further comprising a dish-shaped concave wheel (9) mounted on either end of the central shaft (1), with dish openings of the two dish-shaped concave wheels facing towards each other.

6. The mechanically operational arrangement for continuously variable transmission of claim 1, wherein axial movement of the central shaft (1) is achieved by: a spiral toothed groove section provided at an end of the central shaft (1), a nut threaded onto the spiral toothed groove section and rotated by an external motor, and the nut is inhibited from making axial movement such that the central shaft (1) is driven to make axial movement.

7. The mechanically operational arrangement for continuously variable transmission of claim 1, wherein the toothed groove section (2) is a spiral toothed groove section.

8. The mechanically operational arrangement for continuously variable transmission of claim 7, further comprising:
   a plurality of cylindrical wheels (10) between the dish openings of the two dish-shaped concave wheels (9) that are circumferentially arranged in an equal space;
   wherein the cylindrical wheels (10) are of the same amount as the connecting plates (6);
   a wheel cap (11) provided at either end of each cylindrical wheel (10), wherein the two wheel caps (4) of each cylindrical wheel (3) contact with inner faces of the two dish-shaped concave wheels (9) respectively;
   a wheel sleeve (12) fitted over an external surface of each cylindrical wheel (10);
   wherein the external surface of each wheel sleeve (12) is respectively fixed to an outer end face of one connecting plate (6); and
   wherein each pivot (8) is respectively fixed to the external surface of one wheel sleeve (12).

9. The mechanically operational arrangement for continuously variable transmission of claim 8, further comprising a plurality of booster devices symmetrically mounted on the wheel sleeves (12) and providing power for seesaw-like movement, wherein the symmetrical devices are of the same amount as the wheel sleeves (12).

\* \* \* \* \*